(12) United States Patent
Schulz

(10) Patent No.: US 11,987,125 B2
(45) Date of Patent: May 21, 2024

(54) VEHICLE PANE FOR A HEAD-UP DISPLAY

(71) Applicant: SAINT-GOBAIN GLASS FRANCE, Courbevoie (FR)

(72) Inventor: Valentin Schulz, Niederzier (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/247,811

(22) PCT Filed: Oct. 4, 2021

(86) PCT No.: PCT/EP2021/077217
§ 371 (c)(1),
(2) Date: Apr. 4, 2023

(87) PCT Pub. No.: WO2022/073894
PCT Pub. Date: Apr. 14, 2022

(65) Prior Publication Data
US 2024/0010071 A1 Jan. 11, 2024

(30) Foreign Application Priority Data

Oct. 5, 2020 (EP) .................................... 20200006

(51) Int. Cl.
*B60K 35/00* (2006.01)
*B60J 1/06* (2006.01)
(Continued)

(52) U.S. Cl.
CPC .............. *B60K 35/00* (2013.01); *B60J 1/06* (2013.01); *G02B 27/01* (2013.01); *G02B 27/286* (2013.01); *B60K 35/23* (2024.01); *B60K 2360/23* (2024.01)

(58) Field of Classification Search
CPC ............ B60K 35/00; B60K 2370/1529; B60K 2370/23; G02B 27/01; G02B 27/286; B60J 1/06
See application file for complete search history.

(56) References Cited

U.S. PATENT DOCUMENTS 10,690,977 B1 * 6/2020 Pan .................. G02F 1/133502
2014/0355106 A1 * 12/2014 Laluet ............... B32B 17/10761
359/359

(Continued)

FOREIGN PATENT DOCUMENTS

DE 10 2009 020824 A1 2/2010
EP 0 847 965 B1 10/2004
(Continued)

OTHER PUBLICATIONS

International Search Report as issued in International Patent Application No. PCT/EP2021/077217, dated Jan. 5, 2022.
(Continued)

*Primary Examiner* — Muhammad N Edun
(74) *Attorney, Agent, or Firm* — Pillsbury Winthrop Shaw Pittman LLP

(57) ABSTRACT

A vehicle pane for a head-up display having an outer face that faces external surroundings in the installed state and an inner face that faces a vehicle interior, includes at least one transparent pane; at least one masking strip in an edge region of the pane, and at least one reflection layer for reflecting light which is applied by printing, which is arranged in the region of the masking strip, on the vehicle-interior side of the masking strip.

20 Claims, 4 Drawing Sheets

Figure 1:
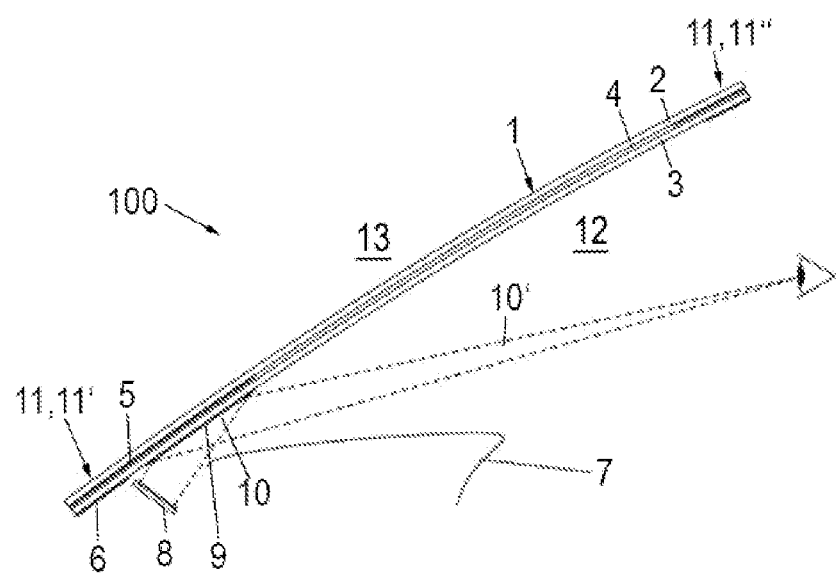

(51) Int. Cl.
   *B60K 35/23*    (2024.01)
   *G02B 27/01*    (2006.01)
   *G02B 27/28*    (2006.01)

(56) References Cited

U.S. PATENT DOCUMENTS

| | | | |
|---|---|---|---|
| 2015/0168767 A1* | 6/2015 | Yonemura | G02F 1/133308 |
| | | | 349/58 |
| 2018/0017823 A1* | 1/2018 | Saenger Nayver | G02F 1/157 |
| 2018/0037095 A1 | 2/2018 | Hanson | |
| 2019/0202177 A1* | 7/2019 | Manz | B32B 3/263 |
| 2021/0316534 A1 | 10/2021 | Fischer et al. | |

FOREIGN PATENT DOCUMENTS

| | | |
|---|---|---|
| EP | 2 434 199 A1 | 3/2012 |
| EP | 3 869 245 A1 | 8/2021 |
| JP | 1 283 432 A2 | 2/2003 |
| JP | 2003-313051 A | 11/2003 |
| JP | 2015-205784 A | 11/2015 |
| JP | 2019-510672 A | 4/2019 |
| JP | 2019-073408 A | 5/2019 |
| WO | WO 2005/063645 A1 | 7/2005 |
| WO | WO 2011/001751 A1 | 11/2011 |
| WO | WO 2020/080355 A1 | 4/2020 |
| WO | WO 2020/094422 A1 | 5/2020 |

OTHER PUBLICATIONS

Office Action as issued in Japanese Patent Application No. 2023-520468, dated Mar. 26, 2024.

\* cited by examiner

VEHICLE PANE FOR A HEAD-UP DISPLAY

CROSS-REFERENCE TO RELATED APPLICATIONS

This application is the U.S. National Stage of PCT/EP2021/077217, filed Oct. 4, 2021, which in turn claims priority to European patent application number 20200006.3 filed Oct. 5, 2020. The content of these applications are incorporated herein by reference in their entireties.

The invention relates to a vehicle pane for a head-up display, a method for production thereof, and use thereof, as well as a head-up display with the vehicle pane and a correspondingly equipped vehicle.

Vehicles, in particular passenger cars, are increasingly equipped with so-called head-up displays (HUDs), as are known, for example, from DE 10 2009 020824 A1. Head-up-displays are provided for displaying image information for a viewer or driver. With a projector as an image generator, for example, in the region of the dashboard or in the roof region, images are projected onto the windshield, reflected there, and perceived by the driver as a virtual image behind the windshield. Thus, important information can be projected into the drivers field of vision, for example, the current driving speed, navigation or warning messages, which the driver can perceive without having to take his eyes off the road. Head-up displays can thus contribute significantly to an increase in traffic safety.

Usually, vehicle windshields consist of two glass panes that are laminated to one another via a thermoplastic film. With the above described head-up display, the problem arises that the projector image is reflected on both surfaces of the windshield. Thus, the driver perceives not only the desired primary image, which is caused by the reflection on the interior-side surface of the windshield (primary reflection). The driver also perceives a slightly offset secondary image, usually weaker in intensity, which is caused by the reflection on the exterior-side surface of the windshield (secondary reflection). This problem is commonly resolved in that the reflecting surfaces are arranged at an angle relative to one another deliberately selected such that the primary image and the secondary image coincide, as a result of which the secondary image is no longer disturbingly noticeable.

It is also known to provide vehicle panes with transparent, electrically conductive coatings. These coatings can act, for example, as IR-reflecting coatings to reduce the heating of the vehicle interior and thus to improve thermal comfort or can be used as heatable coatings by connecting them to a voltage source such that a current flows through the coating. Windshields with conductive coatings in the interior of the composite glass have, in connection with head-up displays, the problem that the conductive coating forms an additional reflecting boundary surface for the projector image. This also results in an undesirable secondary image.

When designing a head-up display, care must further be taken to ensure that the projector has correspondingly high power such that the projected image has sufficient brightness, in particular in the case of incident sunlight and is readily recognizable by the viewer. This requires a certain size of the projector and is associated with corresponding power consumption.

Another problem with head-up displays is the polarization of the light reflected from the composite pane. In general, in the case of reflection from glass, the proportion of light polarized perpendicular to the plane of incidence (s-polarized) is increased, usually resulting in the fact that the HUD display is not visible or is at least less visible when the viewer is wearing sunglasses with polarized lenses. For the image of a head-up display to be recognizable, the sunglasses must be removed.

In contrast, the object of the present invention consists in providing an improved head-up display, with which these disadvantages can be avoided. For example, it would be desirable to have a head-up display in which no unwanted secondary images occur and whose arrangement in the vehicle can be implemented relatively easily with good recognizability with sufficient brightness and contrast of the image information displayed. In addition, energy consumption should be relatively low and the HUD display should also be recognizable even with sunglasses with polarized lenses. Furthermore, the head-up display should be easy and economical to produce in the industrial serious production of vehicles.

These and other objects are accomplished according to the proposal of the invention by a vehicle pane and a head-up display with such a vehicle pane, as well as a correspondingly equipped vehicle, in accordance with the coordinate claims. Advantageous embodiments of the invention emerge from the dependent claims.

According to the invention, a vehicle pane is shown that serves to separate a vehicle interior from external surroundings of the vehicle. The vehicle pane comprises at least one transparent pane. In principle, the vehicle pane can be implemented in any desired form, in particular as thermally toughened single pane safety glass or as a composite pane. Preferably, the vehicle pane serves as a vehicle windshield.

Preferably, the vehicle pane according to the invention, in particular the vehicle windshield, is implemented as a composite pane and comprises a first pane with an outer face and an inner face as well as a second pane with an inner face and an outer face, that are fixedly joined to one another by at least one thermoplastic intermediate layer (adhesive layer). The first pane can also be referred to as the "outer pane"; the second pane as the "inner pane". From the outside to the inside, the surfaces or faces of the two individual panes are commonly referred to as side I, side II, side III, and side IV.

The vehicle pane according to the invention has, in the installed state in the vehicle, an outer face facing the external surroundings and an inner face facing the vehicle interior. In a vehicle pane implemented as a composite pane, the outer face of the first pane is the outer face of the vehicle pane and the outer face of the second pane is the inner face of the vehicle pane.

The vehicle pane according to the invention has, in an edge region, at least one masking strip, which is typically adjacent the pane edge of the pane. The at least one masking strip is a coating comprising one or a plurality of layers and is used to mask structures otherwise recognizable through the pane in the installed state. In particular, in the case of a windshield, the masking strip serves to mask an adhesive bead for gluing the windshield into a vehicle body, i.e., prevents the outside view of the usually irregularly applied adhesive bead such that a harmonious overall impression of the windshield is created. On the other hand, the masking strip serves as UV protection for the adhesive material used. Continuing irradiation with UV light damages the adhesive and, over time, would loosen the bond of the pane to the vehicle body.

The at least one masking strip comprises a colored, preferably black, material that can preferably be baked into the pane. Preferably, the at least one masking strip is opaque, in order, in particular, to serve as visual and UV protection, for example, for an adhesive bead. In the case of panes with an electrically controllable functional layer, the masking strip can, for example, also be used to cover busbars and/or connection elements.

In the context of the present invention, "transparent" means that the total transmittance of the vehicle pane complies with the legal provisions for windshields and preferably has transmittance of more than 70% for visible light and in particular of more than 75%, for example, more than 95%. Correspondingly, "opaque" means light transmittance of less than 30%, in particular less than 25%, for example, less than 5%, in particular 0%.

The vehicle pane according to the invention further comprises at least one reflection layer (mirror layer) for reflection of light into the vehicle interior. It is essential here for the reflection layer to be arranged in the region of the masking strip, on the vehicle-interior side of the masking strip. When looking toward the inner face of the vehicle pane, the reflection layer is thus situated in front of the masking strip.

The expression "in the region of the masking strip" means that the reflection layer is arranged covering or overlapping the masking strip, when viewed at a right angle through the vehicle pane or in orthogonal projection through the pane. The reflection layer and the at least one masking strip can be arranged on different sides of the vehicle pane or on the same side of the vehicle pane. The reflection layer has no section that does not overlap the masking strip, i.e., the reflection layer is formed only where it is situated in front of the masking strip when looking toward the inner face of the vehicle pane.

The expression "reflection of light into the vehicle interior" refers to the installed state of the vehicle pane in the vehicle. The reflected light leaves the vehicle pane on its inner face.

In the installed state of the vehicle pane in the vehicle, an image display device arranged in the vehicle interior is associated with the at least one reflection layer. The image display device includes an image display, the image of which strikes the reflection layer and is reflected into the vehicle interior by the reflection layer. The image display device can also be referred to as a display and can be implemented as a TFT display, an LED display, an OLED display, an EL display, a μLED display, or the like.

The reflection layer is suitably designed for reflecting light from the image display device. The reflection layer is a coating of the pane reflecting the incident light, preferably including or consisting of least one elemental metal and/or at least one metal oxide. The metal is preferably selected from the group consisting of aluminum, tin, titanium, copper, chromium, cobalt, iron, manganese, zirconium, cerium, yttrium, silver, gold, platinum, and palladium, or mixtures thereof.

To produce the reflection layer, a paste is applied to the pane, for example, by a vapor deposition method, such as a CVD method, an atmospheric pressure plasma coating method, spraying (spray coating), or by a sol/gel method and, optionally, subsequent baking or tempering. Preferably, the paste is applied to the pane by printing, in particular by screen printing, pad printing, or offset printing. The applied paste is then baked, i.e., compacted by a heat treatment. Advantageously, the applied paste is dried at a temperature of 50° C. to 180° C. and calcined at temperature of 200° C. to 1000° C., in particular of 400° C. to 700° C.

The paste includes a printable metal solution wherein at least one metal is predominantly bound as a complex. The paste can further include a solvent, preferably selected from alcohols, glycols, propylene glycols, and derivatives thereof, and/or a thickener, preferably a cellulose derivative or polyacrylic acid.

Such pastes for producing reflection layers are commercially available, for example, from the company Ferro GmbH. In addition, such coatings are known from the patent literature, see, for example, WO 2005/063645.

For example, the reflection layer consists of at least one metal oxide, optionally at least one solvent, and/or at least one thickener, and unavoidable impurities whose proportion in the reflection layer is less than 5 wt.-%, preferably less than 1 wt.-%. The metal oxide content in the reflection layer is preferably at least 70%, preferably at least 80%, in particular at least 90%.

The reflection layer can advantageously improve the properties of the reflected light compared to mere reflection of the light on the pane.

In an advantageous embodiment of the invention, the reflection layer has a total reflectivity of light ($R_L$) in the visible wavelength range, measured at an angle of incidence of 65° relative to the normal, greater than 15%, preferably greater than or equal to 25%. Here, the light preferably includes s-polarized and p-polarized light in the visible wavelength range.

The proportion of reflected light is thus comparatively high, with the reflectivity of light ($R_L$) being, for example, approx. 25%.

In addition, relatively high proportions of light polarized in the plane of incidence (p-polarization) can also advantageously be reflected.

In another advantageous embodiment of the invention, the reflection layer has a reflectivity of p-polarized light ($R_{p-L}$) in the visible wavelength range, measured at an angle of incidence of 65° relative to the normal, greater than 5%, preferably greater than 15%.

In the context of the present invention, the visible wavelength range is preferably 380 nm to 780 nm.

Particularly preferably, the above-mentioned reflection values apply to s-polarized and p-polarized light or to p-polarized light in the wavelength range used by the light source.

The present invention is based on the finding that a reflection layer overlapping the at least one, typically opaque, masking strip enables a good image display with high contrast to the masking strip such that it appears bright and is thus also excellently recognizable. Advantageously, this enables a reduction in the power of the image display device and, consequently, reduced energy consumption. This is a major advantage of the invention.

The head-up display according to the invention can be implemented cost-effectively and in a technically simple manner, wherein, in particular, only a relatively small region of the vehicle pane has to be provided with the reflection layer.

The at least one masking strip is preferably applied on the at least one pane by printing, in particular screen printing. The printing ink is printed onto the pane and subsequently dried or baked, for example, at up to 700° C. The printing ink is preferably permanently resistant to light, solvents, and abrasion. The at least one masking strip can in particular transition into dots of different sizes. These so-called "screen-printing dots" are intended to break up the visually solid impression of the black screen-printed edge.

The at least one masking strip is preferably black and can also be referred to as black print or masking print. The material of the masking strip can also be applied to the pane by other common application methods, such as, brushing, rolling, spraying, and the like, and then preferably baked.

According to a preferred embodiment of the vehicle pane, the at least one masking strip consists of a single layer. This has the advantage of particularly simple and economical production of the vehicle pane, since only a single layer has to be formed for the masking strip.

The at least one masking strip can, in principle, be applied to each side of the pane. In the case of a composite pane, it is preferably applied to the inner face (side II) of the first pane or to the inner face (side III) of the second pane, where it is protected against external influences. Particularly preferably, is applied to the inner face (side II) of the first pane.

According to a preferred embodiment of the vehicle pane according to the invention implemented in the form of a composite pane, the reflection layer is attached on the outer face (side IV) of the second pane, enabling particularly easy manufacture. As the inventors were able to demonstrate, with this arrangement, the proportion of reflected light is particularly high. In addition, disturbing secondary images can be avoided. Although the reflection layer is generally quite resistant to weathering, the reflection layer can be covered by a cover layer, in particular a polymer layer or a glass layer in order to protect it against external influences. The glass layer can, in particular, be attached to the composite pane by a thermoplastic intermediate layer.

According to another preferred embodiment of the vehicle pane according to the invention implemented in the form of a composite pane, the reflection layer is attached to the inner face (side III) of the second pane, having the advantage that the reflection layer is protected against external influences.

According to another preferred embodiment of the vehicle pane according to the invention implemented in the form of a composite pane, the reflection layer is attached to the inner face (side II) of the first pane or above the (opaque) masking layer. As the inventors were surprisingly able to demonstrate, with this arrangement, the proportion of the reflected light with p-polarization is particularly high, which has the advantage that the HUD display is clearly visible even with sunglasses with polarized lenses. One or a plurality of other layers can be arranged between the masking layer and the reflection layer. Alternatively, the reflection layer can be applied directly to the masking layer.

According to another preferred embodiment of the vehicle pane according to the invention, in addition to the (opaque) masking strip on the inner face (side II) of the first pane, at least one further masking strip is arranged on the inner face (III) of the second pane and/or on the outer face (IV) of the second pane. The further masking strip serves to improve the adhesion of the panes and is preferably mixed with ceramic particles that give the masking strip a rough and adhesive surface, which on side IV, for example, supports the gluing of the vehicle pane into the vehicle body. On side III, this supports the lamination of the two individual panes of the composite pane. Preferably, the masking strip arranged on side II is also mixed with ceramic particles. A further masking strip applied on the outer face of the second pane (side IV) can also be provided for aesthetic reasons, for example, to conceal the edge of the reflection layer or to design the edge of the transition to the transparent region.

In a section in which the reflection layer is arranged to overlap the opaque masking strip on side II, the masking strip preferably is preferably provided with a widening, in other words, has a greater width (dimension perpendicular to the direction of extension) than in other sections. In this way, the masking strip can be suitably adapted to the dimensions of the reflection layer.

The at least one pane preferably contains or is made of glass, particularly preferably flat glass, float glass, quartz glass, borosilicate glass, soda lime glass, aluminosilicate glass, or clear plastics, preferably rigid clear plastics, in particular polyethylene, polypropylene, polycarbonate, polymethyl methacrylate, polystyrene, polyamide, polyesters, polyvinyl chloride, and/or mixtures thereof. Suitable glasses are known, for example, from EP 0 847 965 B1.

The at least one pane can be clear, or also tinted or colored. Windshields must have, in the central field of vision, sufficient light transmittance, preferably at least 70% in the primary through-vision region A in accordance with ECE-R43. The at least one pane is preferably bent; in other words, it has a curvature.

The at least one pane can have further suitable coatings known per se, for example, antireflection coatings, nonstick coatings, scratch resistant coatings, photocatalytic coatings, or sun protection coatings or low-E coatings.

The thickness of the at least one pane can vary widely and be adapted to the requirements of the individual case. Preferably, panes with the standard thicknesses from 1.0 mm to 25 mm and preferably from 1.4 mm to 2.1 mm are used. The size of the panes can vary widely and depends on the use.

The vehicle pane can have any three-dimensional shape desired. Preferably, the at least one pane has no shadow zones such that it can, for example, be coated by cathodic sputtering. Preferably, the at least one pane is flat or slightly or strongly curved in one or a plurality of spatial directions. The at least one pane can be colorless or colored.

The at least one thermoplastic intermediate layer contains is made of at least one thermoplastic, preferably polyvinyl butyral (PVB), ethylene vinylacetate (EVA), and/or polyurethane (PU) or copolymers or derivatives thereof, optionally in combination with polyethylene terephthalate (PET). The thermoplastic intermediate layer can, however, also contain, for example, polypropylene (PP), polyacrylate, polyethylene (PE), polycarbonate (PC), polymethyl methacrylate, polyvinyl chloride, polyacetate resin, casting resin, acrylate, fluorinated ethylene-propylene, polyvinyl fluoride, and/or ethylene tetrafluoroethylene, or a copolymer or mixtures thereof.

The thermoplastic intermediate layer preferably contains or is made of polyvinyl butyral (PVB), particularly preferably of polyvinyl butyral (PVB) and additives known to the person skilled in the art, such as plasticizers. Preferably, the thermoplastic intermediate layer contains at least one plasticizer.

Plasticizers are chemical compounds that make plastics softer, more flexible, smoother, and/or more elastic. They shift the thermoelastic range of plastics to lower temperatures such that the plastics have the desired more elastic properties in the range of the temperature of use. Preferred plasticizers are carboxylic acid esters, in particular low-volatility carboxylic acid esters, fats, oils, soft resins, and camphor. Other plasticizers are preferably aliphatic diesters of tri- or tetraethylene glycol. Particularly preferably used as plasticizers are 3G7, 3G8, or 4G7, where the first digit indicates the number of ethylene glycol units and the last digit indicates the number of carbon atoms in the carboxylic acid portion of the compound. Thus, 3G8 represents triethylene glycol-bis-(2-ethyl hexanoate), in other words, a compound of the formula $C_4H_9CH(CH_2CH_3)$ $CO(OCH_2CH_2)_3O_2CCH(CH_2CH_3)$ $C_4H_9$.

Preferably, the thermoplastic intermediate layer contains at least at least 3 wt.-%, preferably at least 5 wt.-%, particularly preferably at least 20 wt.-%, even more preferably at least 30 wt.-%, and in particular at least 40 wt.-% of a plasticizer. The plasticizer preferably contains or is made of triethylene glycol-bis-(2-ethyl hexanoate).

More preferably, the thermoplastic intermediate layer contains at least 60 wt.-%, particularly preferably at least 70 wt.-%, in particular at least 90 wt.-% and, for example, at least 97 wt.-% polyvinyl butyral.

The thermoplastic intermediate layer can be formed by a single film or, also, by more than one film.

The thermoplastic intermediate layer can be formed by one or more thermoplastic films arranged one above another, with the thickness of the thermoplastic intermediate layer preferably being from 0.25 mm to 1 mm, typically 0.38 mm or 0.76 mm. However, it would also be conceivable for the thickness to be approx. 10 μm in the case of transparent adhesives.

The thermoplastic intermediate layer can also be a functional thermoplastic intermediate layer, in particular an intermediate layer with acoustically damping properties, an infrared-radiation-reflecting intermediate layer, an infrared-radiation-absorbing intermediate layer, and/or a UV-radiation-absorbing intermediate layer. For example, the thermoplastic intermediate layer can also be a band filter film that blocks out narrow bands of visible light.

The invention further extends to a head-up display with a vehicle pane according to the invention. The head-up display includes an image display device associated with the reflection layer and having an image display directed at the reflection layer, the image of which is reflected by the reflection layer into the vehicle interior. If multiple reflection layers are provided, a corresponding number of image display devices can be provided.

The invention further extends to a vehicle with a head-up display according to the invention.

The invention further extends to a method for producing a vehicle pane according to the invention. The method comprises:
(a) applying at least one masking strip in an edge region of the at least one pane,
(b) arranging at least one reflection layer for reflecting light into the vehicle interior in the region of the masking strip, on the vehicle-interior side of the masking strip.

The at least one masking strip is preferably applied by printing, in particular by screen printing, or by other common application methods, such as brushing, rolling, spraying, and the like onto the at least one pane and then preferably baked. The reflection layer is preferably applied by printing and baked.

To produce a composite pane, at least two panes are preferably joined to one another (laminated) by at least one thermoplastic adhesive layer preferably under the action of heat, vacuum, and/or pressure. Methods known per se can be used to produce a composite pane. For example, so-called autoclave methods can be carried out at an elevated pressure of approx. 10 bar to 15 bar and temperatures from 130° C. to 145° C. for roughly 2 hours. Vacuum bag or vacuum ring methods known per se operate, for example, at roughly 200 mbar and 130° C. to 145° C. The two panes and the thermoplastic intermediate layer can also be pressed in a calender between at least one pair of rollers to form a composite pane. Facilities of this type for producing composite panes are known and normally have at least one heating tunnel upstream from a press. The temperature during the pressing operation is, for example, from 40° C. to 150° C. Combinations of calendering and autoclave methods have proved particularly useful in practice. Alternatively, vacuum laminators can be used. These consist of one or more heatable and evacuable chambers in which the first pane and the second pane can be laminated within, for example, about 60 minutes at reduced pressures from 0.01 mbar to 800 mbar and temperatures from 80° C. to 170° C.

The invention further extends to the use of the vehicle pane according to the invention in vehicles for traffic on land, in the air, or on water, in particular in motor vehicles. Preferred according to the invention is the use of the vehicle pane as a vehicle windshield.

The composite pane can advantageously be the windshield or the roof panel of a vehicle or other vehicle glazing, for example, a partition in a vehicle, preferably in a rail vehicle or a bus. In principle, a composite pane having the features of the vehicle pane can also be an architectural glazing, for example, in an exterior façade of a building or a partition in the interior of a building.

The various embodiments of the invention can be implemented individually or in any combinations. In particular, the features mentioned above and to be explained below can be used not only in the combinations indicated but also in other combinations or in isolation without departing from the scope of the present invention.

Figure 2:
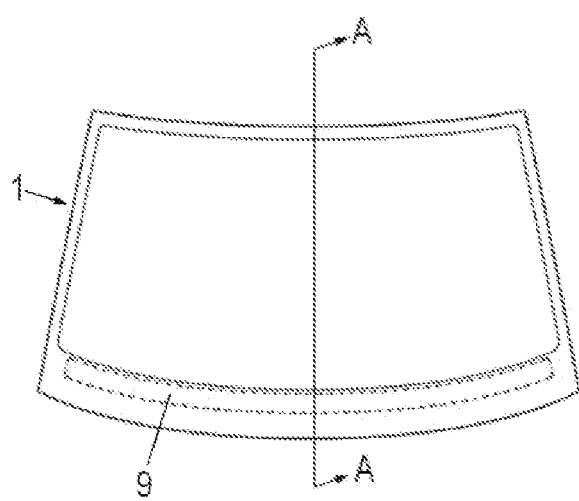
Figure 3:
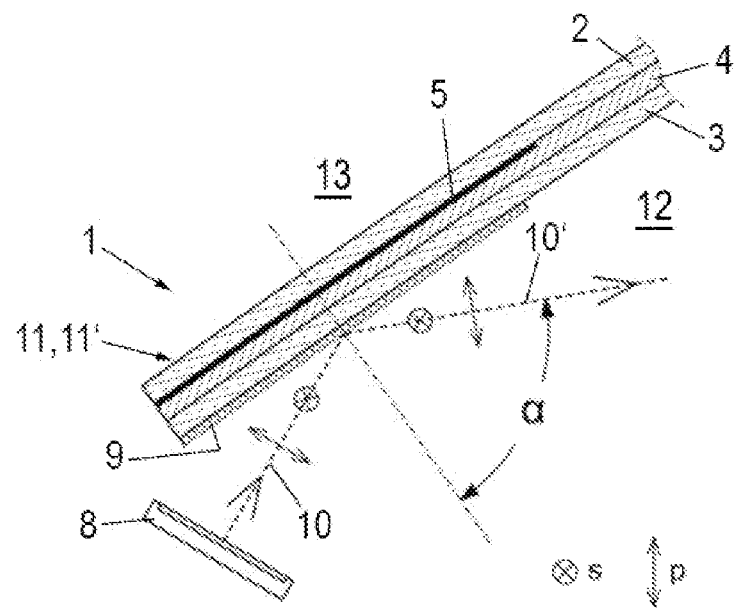
Figure 4:
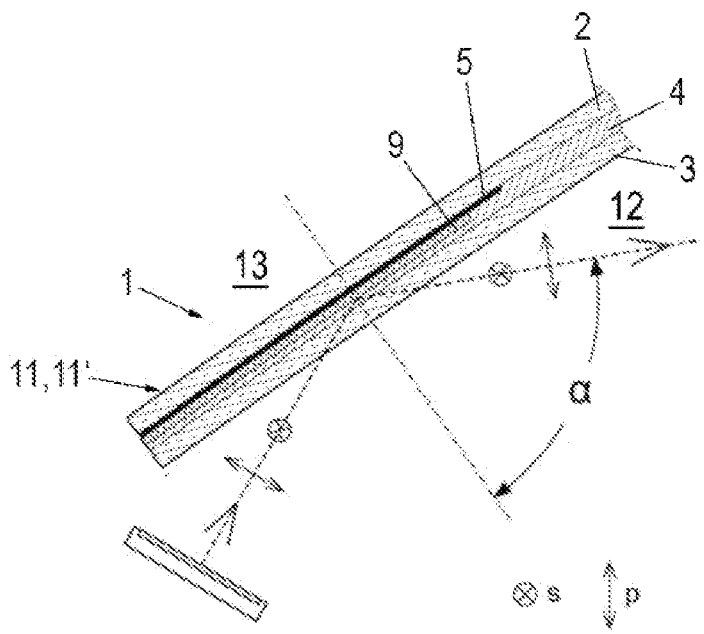
Figure 5:
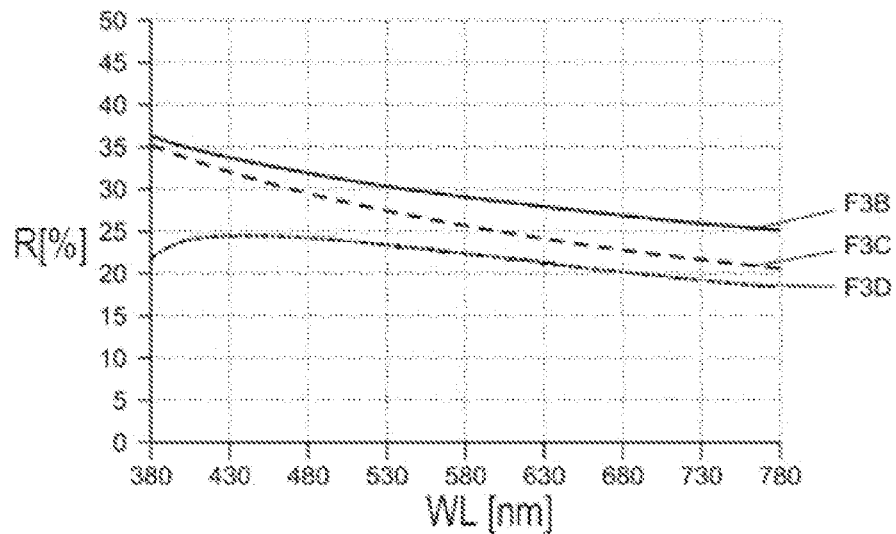
Figure 6:
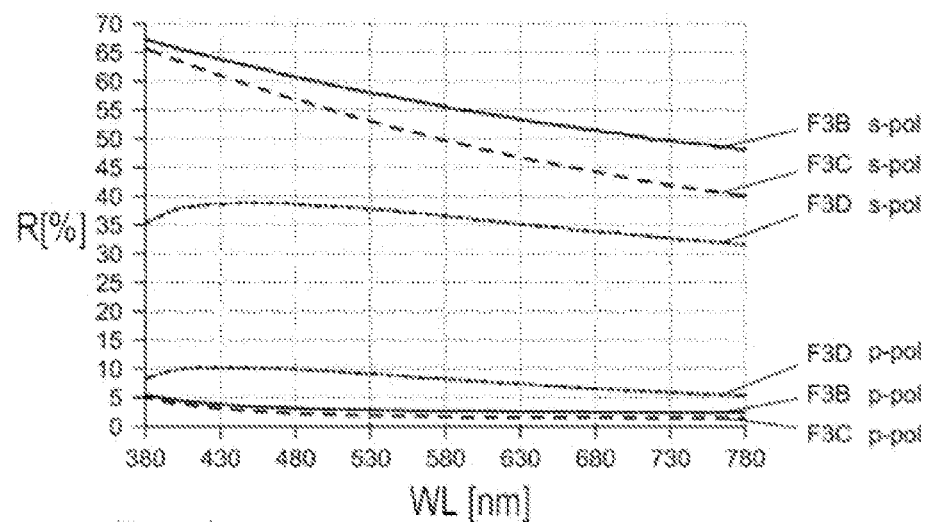
Figure 7:
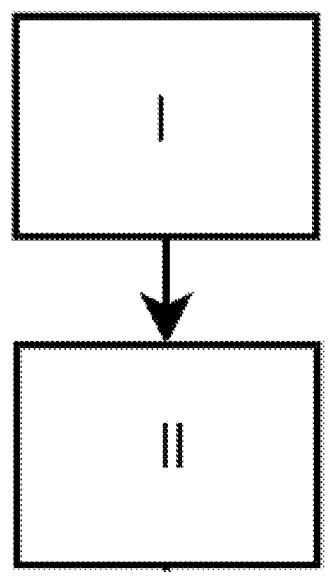

The invention is explained in greater detail in the following using exemplary embodiments with reference to the accompanying figures. They depict in simplified representation, not to scale:

FIG. 1 a cross-sectional view of an exemplary embodiment of the head-up display according to the invention, FIG. 2 a plan view of the vehicle pane of FIG. 1, FIG. 3-4 cross-sectional views of various embodiments of the vehicle pane, FIG. 5 a diagram showing the measured total reflectivity R as a function of wavelength for various vehicle panes (composite panes), FIG. 6 a diagram showing the measured total reflectivity R as a function of wavelength for various vehicle panes analogous to FIG. 5, wherein the total reflectivity R is also shown as a function of s-polarization (s-pol) and p-polarization (p-pol) of the reflected light, FIG. 7 a flow chart illustrating the method according to the invention.

First, considering FIGS. 1 and 2: FIG. 1 depicts a cross-sectional view of an exemplary embodiment of the head-up display 100 according to the invention in a vehicle in a highly simplified, schematic representation. A plan view of the vehicle pane 1 of the head up display 100 is depicted in FIG. 2. The cross-sectional view of FIG. 1 corresponds to the section line A-A of the vehicle pane 1, as indicated in FIG. 2.

The vehicle pane 1 is implemented in the form of a composite pane (see also FIGS. 3 to 4) and comprises a first pane 2 (e.g., outer pane) and a second pane 3 (e.g., inner pane), which are fixedly joined to one another by a thermoplastic intermediate layer 4. The vehicle pane 1 is installed in a vehicle and separates a vehicle interior 12 from external surroundings 13. For example, the vehicle pane 1 is the windshield of a motor vehicle. Alternatively, the vehicle pane has only one individual pane, preferably in the form of a thermally toughened single pane safety glass (not shown).

The first pane 2 and the second pane 3 are made in each case of glass, preferably thermally toughened soda lime glass and are transparent to visible light. The thermoplastic intermediate layer 4 consists of a thermoplastic, preferably polyvinyl butyral (PVB), ethylene vinylacetate (EVA), and/or polyethylene terephthalate (PET).

The outer face I of the first pane 2 faces the external surroundings 13 and is, at the same time, the outer face of the vehicle pane 1. The inner face II of the first pane 2 and the inner face III of the second pane 3 face the intermediate layer 4 in each case. The outer face IV of the second pane 3 faces the vehicle interior 12 and is, at the same time, the inner face of the vehicle pane 1. It goes without saying that the vehicle pane 1 can have any suitable geometric shape and/or curvature. As a vehicle pane 1, it typically has convex curvature.

In the edge region 11 of the vehicle pane 1, there is a frame-like circumferential first masking strip 5 on the inner face (side II) of the first pane 2. The first masking strip 5 is opaque and prevents the view of structures arranged to the inside of the vehicle pane 1, for example, an adhesive bead for gluing the vehicle pane 1 into a vehicle body. The first masking strip 5 is preferably black. The first masking strip 5 is made of an electrically nonconductive material conventionally used for masking strips, for example, a black colored screen printing ink that is baked.

Furthermore, the vehicle pane 1 has, in the edge region 11 in the outer face IV of the second pane 3, a second masking strip 6 made of an electrically nonconductive material. The second masking strip 6 is implemented circumferentially in a frame-like manner. Like the first masking strip 5, the second masking strip 6 is made from an electrically nonconductive material conventionally used for masking strips, for example, a black colored screen printing ink that is baked.

On the outer face IV of the second pane 3, there is a reflection layer 9, which is applied as a paste by printing onto the pane 3 and baked. The reflection layer is a metal oxide coating containing at least one metal oxide.

When viewed at a right angle through the vehicle pane 1, the reflection layer 9 is arranged overlapping the first masking strip 5, with the first masking strip 5 completely overlapping the reflection layer 9, i.e., the reflection layer 9 has no section that does not overlap the first masking strip 5. Here, the reflection layer 9 is arranged, for example, only in the lower (engine-side) section 11' of the edge region 11 of the vehicle pane 1. However, it would also be possible to arrange the reflection layer 9 in the upper (roof-side) section 11" or in a lateral section of the edge region 11. Furthermore, a plurality of reflection layers 9 can be provided, arranged, for example, in the lower (engine-side) section 11' and in the upper (roof-side) section 11" of the edge region 11. For example, the reflection layers 9 could be arranged such that a (partially) circumferential image is generated.

The first masking strip 5 is widened in the lower (engine-side) section 11' of the edge region 11, i.e., the first masking strip 5 has in the lower (engine-side) section 11' of the edge region 11 a greater width than in the upper (roof-side) section 11" of the edge region 11 (as also in the lateral sections of the edge region 11 not visible in FIG. 1) of vehicle pane. "Width" means the dimension of the first masking strip 5 perpendicular to its extension direction. Here, the reflection layer 9 is arranged, for example, above the second masking strip 6 (in other words, not overlapping), although, for aesthetic reasons, it would be equally possible for there to be overlap.

The head-up display 100 further has an image display device 8 as an image generator arranged in the dashboard 7. The image display device 8 is used to generate light 10 (image information) that is directed at the reflection layer 9 and is reflected by the reflection layer 9 as reflected light 10' into the vehicle interior 12, where it can be seen by a viewer, e.g., driver. The reflection layer 9 is implemented suitably for reflection of the light of the image display device, i.e., of an image of the image display. It would also be possible, for example, to arrange the image display device 8 in the A-pillar of a motor vehicle or on the roof (on the vehicle-interior side in each case), if the reflection layer 9 is suitably positioned for this. If multiple reflection layers 9 are provided, a separate image display device 8 can be associated with each reflection layer 9, i.e., multiple image display devices 8 can be arranged. It would also be possible, for example, for the vehicle pane 1 to be a roof panel, side pane, or rear pane.

In the plan view of FIG. 2, the reflection layer 9 is shown extending along the lower section 11' of the edge region 11.

Reference is now made to FIGS. 3 to 4, wherein cross-sectional views of various embodiments of the vehicle pane 1 are depicted. The cross-sectional views of FIGS. 3 to 4 correspond to the section line A-A in the lower section 11' of the edge region 11 of the vehicle pane 1, as indicated in FIG. 2.

In the variant of the vehicle pane 1 depicted in FIG. 3, the first (opaque) masking strip 5 is situated on the inner face (side II) of the first pane 2. The reflection layer 9 is applied on the outer face (side IV) of the second pane 3. Light 10 from the image display device 8 is reflected by the reflection layer 9 as reflected light 10' into the vehicle interior 12. The polarizations of the light 10, 10' (s-polarization, p-polarization) are illustrated schematically. This variant has the advantage that a relatively large proportion of the incident light 10 is reflected. In addition, the image is readily recognizable against the background of the opaque (first) masking layer 5 with high contrast.

The variant of the vehicle pane 1 depicted in FIG. 4 differs from the variant of FIG. 3 only in that the reflection layer 9 is applied on the (first) masking layer 5. This variant has the particular advantage that a relatively large proportion with p-polarization of the incident light 10 is reflected. In addition, the image is readily recognizable against the background of the opaque (first) masking layer 5 with high contrast. The reflection layer 9 is well protected, in the interior of the composite pane, against external influences.

In all exemplary embodiments, the reflection layer 9 is arranged on the vehicle-interior side of the first masking strip 5, i.e., when looking at the inner face of the vehicle pane 1, the reflection layer 9 is situated in front of the first masking strip 5.

FIG. 5 shows, using a diagram, the measured total reflectivity R (in % of the incident light) as a function of wavelength (nm) with different vehicle panes (composite panes). The measurements were made with an angle of incidence of 65° relative to the normal. The curves F3B, F3C, and F3D refer, in this order, to a vehicle pane 1 with a reflection layer 9 on side IV and without masking layer 5 (F3B), a vehicle pane 1 with a reflection layer 9 on side IV and with masking layer 5 (F3C), and a vehicle pane 1 with a reflection layer 9 on side II and with masking layer 5, wherein the reflection layer is arranged on the masking layer 5 (F3D).

It can be seen that the total reflectivity with the arrangement F3B is the highest, with the total reflectivity with the arrangement F3C being in fact lower, but still comparatively good. With the arrangement F3D, the total reflectivity is lower.

FIG. 6 shows, in a diagram, the measured total reflectivity R (in % of the incident light) as a function of wavelength (nm) with different vehicle panes in accordance with arrangements F3B, F3C, and F3D, wherein the total reflectivity R is also shown as a function of the s-polarization (s-pol) and p-polarization (p-pol) of the reflected light. These measurements were also made at an angle of incidence of 65° relative to the normal.

Accordingly, the proportion of the s-polarized reflected light is particularly high in the arrangement F3B. In particular, the arrangements F3B, F3C, and F3D have a higher total reflectivity in the p-polarization than the reflecting combination film. Surprisingly, the proportion of the p-polarized reflected light in the arrangement F3D is particularly high and in particular higher than in the arrangements F3B and F3C.

FIG. 7 illustrates the method according to the invention using a flow chart. Here, in a first step I, at least one masking strip 5 is applied in the edge region 11 of the at least one pane 2, 3. In a second step, at least one reflection layer 9 for reflecting light into the vehicle interior for displaying image data is arranged in the region of the masking strip 5, on the vehicle-interior side of the masking strip 5.

It follows from the above statements that the invention makes available an improved vehicle pane or a head-up display equipped therewith that enables good image display with high contrast to the masking strip. Unwanted secondary images can be avoided. The head-up display according to the invention can be produced simply and economically using known production methods.

REFERENCE CHARACTERS

- 1 vehicle pane
- 2 first pane
- 3 second pane
- 4 intermediate layer
- 5 first masking strip
- 6 second masking strip
- 6' further masking strip
- 7 dashboard
- 8 image display device
- 9 reflection layer
- 10, 10' light
- 11, 11', 11" edge region
- 12 vehicle interior
- 13 external surroundings
- 100 head-up-display
- I outer face of the first pane 2
- II inner face of the first pane 2
- III inner face of the second pane 3
- IV outer face of the second pane 3
- A-A' section line

The invention claimed is:

1. A vehicle pane for a head-up display having an outer face that faces external surroundings in an installed state and an inner face that faces a vehicle interior, comprising:
   at least one transparent pane,
   at least one masking strip in an edge region of the pane,
   at least one reflection layer for reflecting light, the at least one reflection layer being a coating covering a portion of a face of the vehicle pane and arranged in a region of the masking strip, on a vehicle-interior side of the masking strip so as to overlap the at least masking strip in said region.

2. The vehicle pane according to claim 1, which is implemented in the form of a composite pane and comprises a first pane with an outer face facing the external surroundings in the installed state and an inner face and a second pane with an outer face that faces the vehicle interior in the installed state and an inner face, which first and second panes are fixedly joined to one another by at least one thermoplastic intermediate layer.

3. The vehicle pane according to claim 2, wherein the at least one masking strip is applied to the inner face of the first pane.

4. The vehicle pane according to claim 3, wherein the reflection layer is attached on the outer face of the second pane.

5. The vehicle pane according to claim 3, wherein the reflection layer is attached on the inner face of the second pane.

6. The vehicle pane according to claim 3, wherein the reflection layer is attached on the inner face of the first pane on the masking layer.

7. The vehicle pane according to claim 2, wherein the at least one masking strip is arranged on the inner face of the first pane and at least one further masking strip is arranged on the inner face of the second pane and/or on the outer face of the second pane.

8. The vehicle pane according to claim 1, wherein the at least one masking strip is formed circumferentially as a frame and has, in a section that overlaps the reflection layer, a greater width than in sections different therefrom.

9. The vehicle pane according to claim 1, wherein the reflection layer contains at least one elemental metal or one metal oxide.

10. The vehicle pane according to claim 9, wherein the metal is selected from the group consisting of aluminum, tin, titanium, copper, chromium, cobalt, iron, manganese, zirconium, cerium, yttrium, silver, gold, platinum, palladium, and mixtures thereof.

11. The vehicle pane according to claim 9, wherein the reflection layer is produced by printing a paste containing an elemental metal or a metal oxide onto the pane and then baking the paste.

12. The vehicle pane according to claim 1, wherein the reflection layer has reflectivity of p-polarized light in the visible wavelength range, measured at an angle of incidence of 65° relative to the normal, of greater than 5%.

13. The vehicle pane according to claim 12, wherein the reflection layer has reflectivity of p-polarized light in the visible wavelength range, measured at an angle of incidence of 65° relative to the normal, of greater than 15%.

14. A head-up display, comprising:
   a vehicle pane according to claim 1,
   an image display device associated with the reflection layer and having an image display directed at the reflection layer, the image of which is reflected by the reflection layer into the vehicle interior.

15. A vehicle with a head-up display according to claim 14.

16. A method for producing a vehicle pane according to claim 1, comprising:
   applying at least one masking strip in an edge region of the at least one pane,
   arranging a reflection layer for reflecting light in the region of the masking strip, on the vehicle-interior side of the masking strip.

17. A method comprising providing a vehicle pane according to claim 1 in a vehicle for traffic on land, in the air, or on water.

18. The method according to claim 17, wherein the vehicle pane is a vehicle windshield.

19. The vehicle pane according to claim 1, wherein the at least one reflection layer for reflecting light is applied by printing.

20. The vehicle pane according to claim 1, wherein the reflecting layer is adapted to reflect light of an image display device of the head-up display.

\* \* \* \* \*

UNITED STATES PATENT AND TRADEMARK OFFICE
CERTIFICATE OF CORRECTION

| | | |
|---|---|---|
| PATENT NO. | : 11,987,125 B2 | Page 1 of 1 |
| APPLICATION NO. | : 18/247811 | |
| DATED | : May 21, 2024 | |
| INVENTOR(S) | : Valentin Schulz | |

It is certified that error appears in the above-identified patent and that said Letters Patent is hereby corrected as shown below:

On the Title Page

In Item (56) References Cited: FOREIGN PATENT DOCUMENTS, should read:
EP 1 283 432 A2 2/2003

Signed and Sealed this
Eighteenth Day of June, 2024

Katherine Kelly Vidal
*Director of the United States Patent and Trademark Office*